(12) United States Patent
Ralea et al.

(10) Patent No.: US 6,702,069 B2
(45) Date of Patent: Mar. 9, 2004

(54) ELECTRONIC AIRCRAFT BRAKING SYSTEM WITH BRAKE WEAR MEASUREMENT, RUNNING CLEARANCE ADJUSTMENT AND PLURAL ELECTRIC MOTOR-ACTUATOR RAM ASSEMBLIES

(75) Inventors: Mihai Ralea, Boonton Township, OH (US); Franklin C. Christ, Pompton Plains, NJ (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/268,409

(22) Filed: Oct. 10, 2002

(65) Prior Publication Data

US 2003/0029680 A1 Feb. 13, 2003

Related U.S. Application Data

(60) Division of application No. 09/486,687, filed on Mar. 1, 2000, now Pat. No. 6,471,015, which is a continuation-in-part of application No. 08/853,513, filed on May 9, 1997.

(51) Int. Cl.⁷ ............................................. F16D 55/36
(52) U.S. Cl. ...................... 188/71.5; 188/162
(58) Field of Search ..................... 188/1.172, 72.1, 188/71.5, 162

(56) References Cited

U.S. PATENT DOCUMENTS 4,381,049 A    4/1983    Crossman (List continued on next page.)

FOREIGN PATENT DOCUMENTS

| DE | 30 32 558 A | 3/1982 |
|----|-------------|--------|
| DE | 34 44 301 A | 6/1986 |
| DE | 195 19 948 A | 12/1996 |
| DE | 195 36 695 A | 4/1997 |
| EP | 0 526 273 A | 2/1993 |
| EP | 0 643 290 A | 3/1995 |
| EP | 0 703 133 A | 3/1996 |
| WO | 93 00525 A | 1/1993 |
| WO | 95 33933 A | 12/1995 |

OTHER PUBLICATIONS

Patent Abstracts of Japan, vol. 15, No. 186 (M–1112), May 14, 1991, & JP 03 045462 A (Honda Motor).

*Primary Examiner*—Christopher P. Schwartz
(74) *Attorney, Agent, or Firm*—Renner, Otto, Boisselle & Sklar, LLP

(57) ABSTRACT

An electrically actuated aircraft brake system and method which provides for brake wear measurement, brake running clearance adjustment, ram position-based control and improved construction and operation. Brake wear and running clearance measurement are obtained by analyzing the output of position sensing circuitry. The position sensing circuitry, preferably including a LVDT position sensor, is also used to determine braking load, a brake controller including circuitry for effecting displacement of one or more reciprocating rams to load a brake disk stack by a predetermined amount based on a present displacement value of the position signal obtained from the position sensor. The position sensor preferably includes a LVDT transducer connected between the reciprocating ram and a brake housing, and the motive device preferably includes a servo motor. Also provided is an actuator housing including a guideway for each ram, the guideway and ram having the same polygonal cross-section, whereby the ram nut is guided and restrained from rotation by the guideway as it is translated by a ball screw in threaded engagement with the ram nut for selective movement into and out of forceful engagement with the brake disk stack for applying and releasing braking force on a rotatable wheel. An electric motor is drivingly connected to each ball screw by a first gear integral with the ball screw, a second gear in mesh with the first gear, and a pinion on a rotating drive shaft of the electric motor.

8 Claims, 12 Drawing Sheets

U.S. PATENT DOCUMENTS

| | | |
|---|---|---|
| 4,440,279 A | 4/1984 | Schreiner |
| 4,474,060 A | 10/1984 | Crossman |
| 4,503,946 A | 3/1985 | Davidson et al. |
| 4,542,809 A | 9/1985 | Crossman |
| 4,712,441 A | 12/1987 | Abraham |
| 4,865,162 A | 9/1989 | Morris et al. |
| 4,995,483 A | 2/1991 | Moseley et al. |
| 5,339,069 A | 8/1994 | Penner et al. |
| 5,632,359 A | 5/1997 | Camps et al. |
| 5,983,149 A | 11/1999 | Tate et al. |
| 6,000,507 A | 12/1999 | Bohm et al. |
| 6,003,640 A | 12/1999 | Ralea |

ELECTRONIC AIRCRAFT BRAKING SYSTEM WITH BRAKE WEAR MEASUREMENT, RUNNING CLEARANCE ADJUSTMENT AND PLURAL ELECTRIC MOTOR-ACTUATOR RAM ASSEMBLIES

RELATED APPLICATION DATA

This application is a division of U.S. patent application Ser. No. 09/486,687, file Mar. 1, 2000 now U.S. Pat. No. 6,471,015 which is a continuation-in-part of U.S. patent application Ser. No. 08/853,513, filed May 9, 1997. The aforesaid applications are hereby incorporated herein by reference in their entireties.

FIELD OF THE INVENTION

The invention herein described relates generally to brake control systems, more particularly to electronic braking systems, and still more particularly to aircraft braking systems.

BACKGROUND OF THE INVENTION

Known in the prior art are aircraft wheel and brake assemblies including a non-rotatable wheel support, a wheel mounted to the wheel support for rotation, and a brake disk stack having front and rear axial ends and alternating rotor and stator disks mounted with respect to the wheel support and wheel for relative axial movement. Each rotor disk is coupled to the wheel for rotation therewith and each stator disk is coupled to the wheel support against rotation. A back plate is located at the rear end of the disk pack and a brake head is located at the front end. The brake head houses a plurality of actuator rams that extend to compress the brake disk stack against the back plate. Torque is taken out by the stator disks through a static torque tube or the like.

As the brake disks wear, the running clearance of the actuator rams correspondingly increases. To maintain an acceptable running clearance, mechanical adjustor devices have been employed. While functional, these devices add weight and complexity to the braking system, and need to be overhauled usually each time the brake disk stack is replaced. For at least these reasons, it would be desirable to provide for running clearance adjustment without the need for these mechanical adjustor devices.

Present day aircraft brake systems also have employed wear pin indicators to measure overall wear of the brake disk stack. Brake wear is indicated by the length of the pin relative to a reference plate. This arrangement requires a visual inspection of the pin to determine wear and is inherently imprecise. It would be desirable to provide for brake wear measurement without the need for a visual inspection and with greater precision.

Moreover, it would be desirable to provide for brake actuator running clearance and brake wear indication utilizing means that may be interfaced into an electro-mechanical brake system. Electro-mechanical braking systems eliminate drawbacks associated with hydraulic braking systems such as fluid leaks, high maintenance requirements, fire hazard and higher overall weight.

Electrically actuated aircraft brakes of various configurations are known, as exemplified by U.S. Pat. Nos. 4,381,049, 4,432,440, 4,542,809 and 4,567,967. The brake assemblies shown in these patents include electric motors which respond to an electrical control signal to effect rotation of a ring gear member which interacts through a plurality of balls to drive a linearly movable ram member into contacting engagement with a brake disk stack to effect compression thereof and braking of a wheel.

In U.S. Pat. No. 4,596,316, another configuration of an electrically actuated brake uses a roller screw drive wherein a ring gear member interacts through a plurality of roller screws to drive a ram member into engagement with the brake pressure plate to effect compression of the brake disk stack for braking action. A plurality of electric motors and their associated pinions drive a ring gear into rotation and the plurality of roller screws effect linear axial movement of the ram member.

In U.S. Pat. No. 4,865,162, a further electrically actuated aircraft brake employs a roller screw drive mechanism driven by an electric torque motor through a gear drive associated with either the screw or the nut of the roller screw drive mechanism. Rotation of the gear drive by the torque motor moves the other one of the screw or nut into axial engagement with a brake disk stack to compress the stack for braking. A plurality of the roller screw drive mechanisms and respective gear drives and torque motors are mounted in a balanced arrangement about the axis of the wheel to apply and release a brake pressure force on the brake disk stack in response to an electrical control signal to the torque motors.

In U.S. Pat. No. 4,995,483, there is described a motor position feedback control system for an electrically actuated aircraft brake. The system controller provides brake clamping and declamping in response to a position feedback controlled brake actuator in which an electric torque motor drives a rotating member of a reciprocating drive mechanism to axially move another member into and out of engagement with a brake pressure plate of a multi-disk brake assembly. The position feedback is obtained using a rotor position resolver which provides relative position information to the controller. Such a system requires a re-calibration of the position sensor after a power interruption which may result in loss of braking capability, long recovery time and possible uncommanded brake clamp force application.

Among other things, it would be desirable to have an electrically actuated aircraft brake that has greater durability than the prior art brakes that use roller screw drive mechanisms, thereby to minimize deterioration of components that may lead to increased friction in the mating screw components and the associated loss of efficiency and response of the brake. Also, it would be desirable to have an electrically actuated brake wherein equal force can be applied by multiple ram actuators and which optimizes brake clamping force dynamic response.

SUMMARY OF THE INVENTION

The present invention provides a brake system and method, particularly an electrically actuated aircraft brake system and method, which provides various advantages over known brake systems and methods.

According to one aspect of the invention, a brake system and method are provided to enable brake wear measurement while eliminating the need for previously used brake wear indicator pins. More particularly, brake wear measurement is obtained by analyzing the output of position sensing circuitry. In a preferred embodiment, present brake disk stack height is measured using an actuator position sensor or sensors, and the output of the sensor or sensors is compared to a reference brake disk stack height to provide an indication of the amount of brake wear. The reference brake disk stack height preferably is obtained by loading the brake disk stack by a predetermined amount and using the actuator position sensor or sensors to measure the displacement of the actuator ram or rams to the brake disk stack. In brake systems employing multiple actuator rams, the outputs of respective position sensors are averaged to provide an actuator displacement measurement for the associated brake disk stack. The actuator position sensor preferably is an absolute position encoder that outputs a signal representative of the actual position of the actuator ram relative to the brake housing.

Accordingly, a preferred embodiment of the invention provides a brake system and method characterized by a brake disk stack, at least one reciprocating ram, a motive device operatively connected to the reciprocating ram for selectively moving the reciprocating ram into and out of forceful engagement with the brake disk stack for applying and releasing braking torque on a rotatable member (e.g., a wheel), and a controller that controls the motive device for selective control of the reciprocating ram and regulation of the force applied by the reciprocating ram against the brake disk stack. In accordance with the invention, a position sensor supplies a position signal representative of the position of the reciprocating ram, and the controller includes means for effecting displacement of the reciprocating ram to load the brake disk stack by a predetermined amount to obtain from the position sensor a present displacement value of the position signal, and for comparing the present displacement value to a reference displacement value to provide a measurement of wear of the brake disk stack.

A preferred embodiment of the invention is further characterized by the use of a position sensor directly linked to the actuator ram, and preferably one that is robust. A preferred position sensor is a LVDT transducer, although other types of transducers may be used, for example a potentiometer, an optical encoder, a RVDT transducer with a rotary input provided by suitable gearing, etc. As is preferred, the LVDT transducer is connected between the reciprocating ram and a brake housing to which the motive device is mounted. The motive device preferably is an electric servo motor, and the controller preferably includes a processor for controlling actuator position and application force. The processor preferably is programmed to perform the aforesaid brake wear measurement, and also a new brake disk stack measurement routine for obtaining a brake wear reference value for the new brake disk stack. The new brake disk stack measurement routine includes the steps of effecting displacement of the reciprocating ram to load the new brake disk stack by a predetermined amount to obtain from the position transducer a new brake disk stack displacement value of the position signal and then storing, preferably in non-volatile memory, the new brake disk stack displacement value as the reference displacement value against which subsequently obtained present displacement values are compared to provide a measurement of wear of the brake disk stack.

The present invention also provides a brake system and method, particularly an electrically actuated aircraft brake system and method, which provides for running clearance adjustment while eliminating the need for previously used mechanical adjustor devices. Running clearance adjustment is obtained by performing a running clearance adjustment routine which analyzes the output of the position sensing circuitry. In a preferred embodiment, the brake controller is operable to effect movement of the reciprocating ram for loading the brake disk stack by a predetermined amount to obtain from the position transducer a present displacement value of the position signal, and then to use the present displacement value to determine a running clearance position of the reciprocating ram. More particularly, provision is made for subtracting the predetermined clearance value from the present displacement value to obtain a new running clearance value, storing the new running clearance value in memory, and then using the new running clearance value in determining the running clearance position of the reciprocating ram.

As will be appreciated, an improved brake system arises from the use of either one or both of the above summarized wear measurement and running clearance features. In addition, these features are particularly useful in aircraft brake systems and particularly an electrically actuated aircraft brake system which does not need hydraulic components which are subject to various drawbacks including fluid leaks, high maintenance requirements, fire hazard, higher overall weight, etc.

According to another aspect of the invention, there is provided an electro-mechanical brake assembly comprising a brake disk stack; a housing including a guideway; a ram nut guided by the guideway for movement toward and away from the brake disk stack; a lead (preferably a ball) screw in threaded engagement with the ram nut whereupon rotation of the lead screw effects linear movement of the nut for selective movement into and out of forceful engagement with the brake disk stack for applying and releasing braking force on a rotatable wheel; and an electric motor drivingly connected to the lead screw gear for rotating the lead screw to effect movement of the ram nut toward and away from the brake disk stack. In contrast to prior art ram assemblies using, for example, a key or spline to prevent rotation of the ram as it moves linearly, the guideway and ram nut of the present invention respectively have polygonal cross-sections defined by plural outer side surfaces which rotationally interfere with one another to restrain rotation of the ram nut relative to the housing. This arrangement provides for maximum alignment and resistance to cocking and binding of the ram, while minimizing sliding friction.

In a preferred embodiment, the electric motor is drivingly connected to the lead screw by a first gear integral with the lead screw, a second gear in mesh with the first gear, and a pinion on a rotating drive shaft of the electric motor. Also in a preferred embodiment, the outer side surfaces of the guideway and ram nut are planar, and the outer side surfaces of each one of the guideway and ram together define a regular polyhedron.

According to another broad aspect of the invention, there is provided a brake system wherein a position sensor is used to determine braking load. In a preferred embodiment, the brake system comprises a brake disk stack; a reciprocating ram; a motive device operatively connected to the reciprocating ram for selectively moving the reciprocating ram into and out of forceful engagement with the brake disk stack for applying and releasing braking force on a rotatable wheel; a controller for controlling the motive device for selective control of the reciprocating ram and regulation of the force applied by the reciprocating ram against the brake disk stack; and a position sensor which supplies a position signal representative of the position of the reciprocating ram; and characterized by the controller including circuitry for effecting displacement of the reciprocating ram to load the brake disk stack by a predetermined amount based on a present displacement value of the position signal obtained from the position sensor. This arrangement provides for optimum brake clamping force dynamic response, eliminates or minimizes hysteresis associated with other means of control, and enables the system to apply equal force on all actuators. The position sensor preferably includes a LVDT transducer connected between the reciprocating ram and a brake housing, and the motive device preferably includes a servo motor.

The foregoing and other features of the invention are hereinafter fully described and particularly pointed out in the claims, the following description and the annexed drawings setting forth in detail one or more illustrative embodiments of the invention, such being indicative, however, of but one or a few of the various ways in which the principles of the invention may be employed.

DETAILED DESCRIPTION OF THE INVENTION

Figure 1:
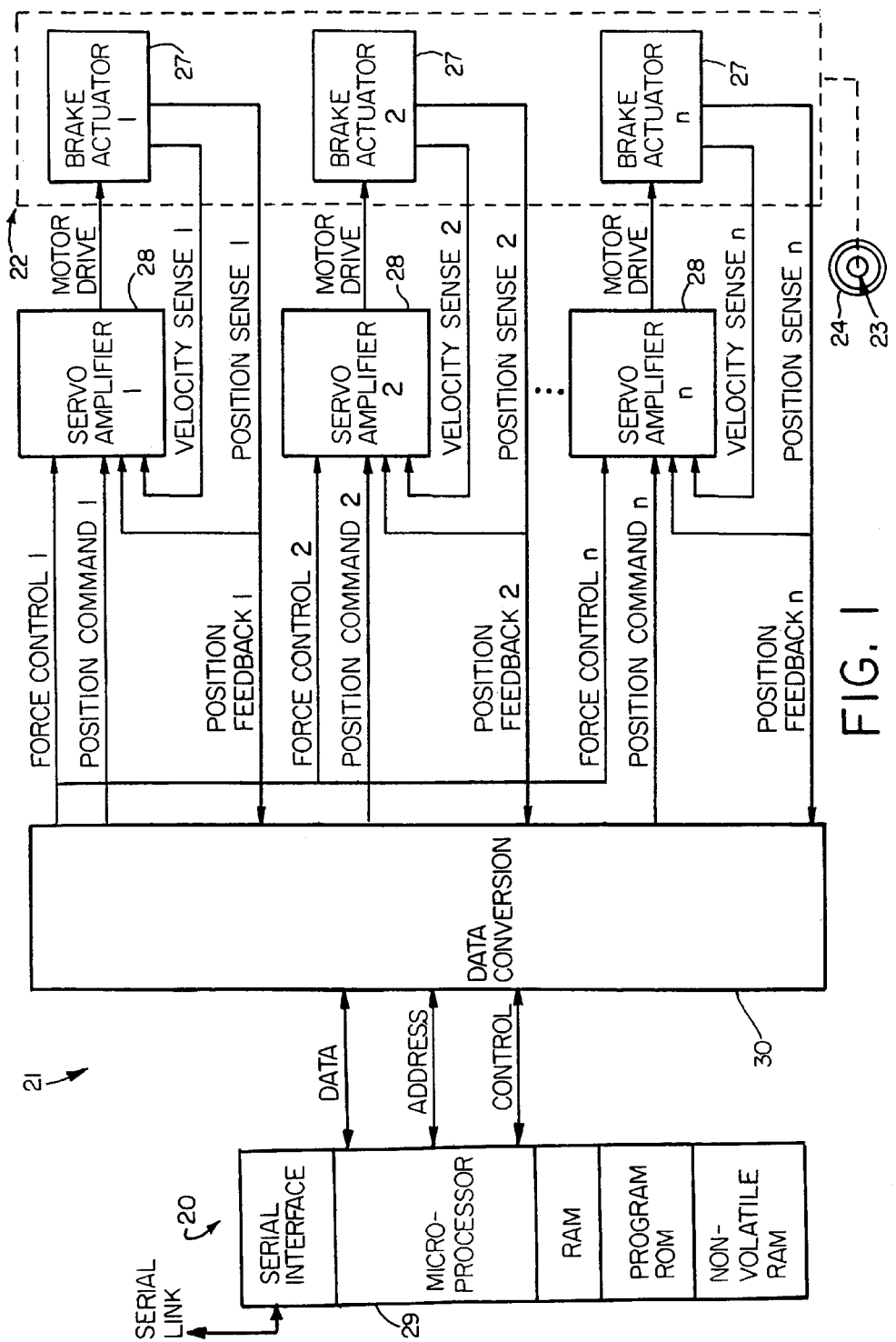
FIG. 1 is a diagrammatic illustration of an exemplary multi-actuator computer controlled brake actuation system.

Referring now in detail to the drawings, FIG. 1 diagrammatically illustrates an exemplary multi-actuator computer controlled brake actuation system 20 to which the principles of the invention may be applied. The major functions of the system 20 are performed by a controller 21 and a brake actuator assembly 22. The brake actuator assembly 22 may be mounted in a conventional manner on a wheel and brake assembly 23 to apply and release braking force on a rotatable wheel 24 of such wheel and brake assembly. The present invention is particularly suited for use in aircraft braking systems, as will be appreciated by those skilled in the art.

Because the invention was conceived and developed for use in an aircraft braking system and particularly in association with the system 20, it will be herein described chiefly in this context. However, the principles of the invention in their broader aspects can be adapted to other types of systems including, for example, hydraulic systems wherein hydraulic actuators are used and controlled either hydraulically or electrically. Moreover, the following discussion of an exemplary multi-actuator computer controlled brake actuation system is given for the sake of illustration and not by way of limitation, except as defined in the claims included at the end of this specification. Accordingly, only general operational details and features of such system will be described so as not to obscure the teachings of the present invention with details that may vary from one particular application to another.

In the illustrated exemplary system 20, the brake actuator assembly 22 includes at least one and preferably a plurality of electro-mechanical actuators 27. The controller 21 includes a corresponding number of independent servo amplifiers 28, a micro-processor 29 with associated peripherals, and a data input/output (I/O) circuitry 30. As depicted, plural (for example, four) independent, linear electro-mechanical servo loops operate in a position mode, i.e., the linear position of each actuator is a function of an analog input voltage (or digital equivalent for a digital signal processor) applied to a position command input.

Figure 2:
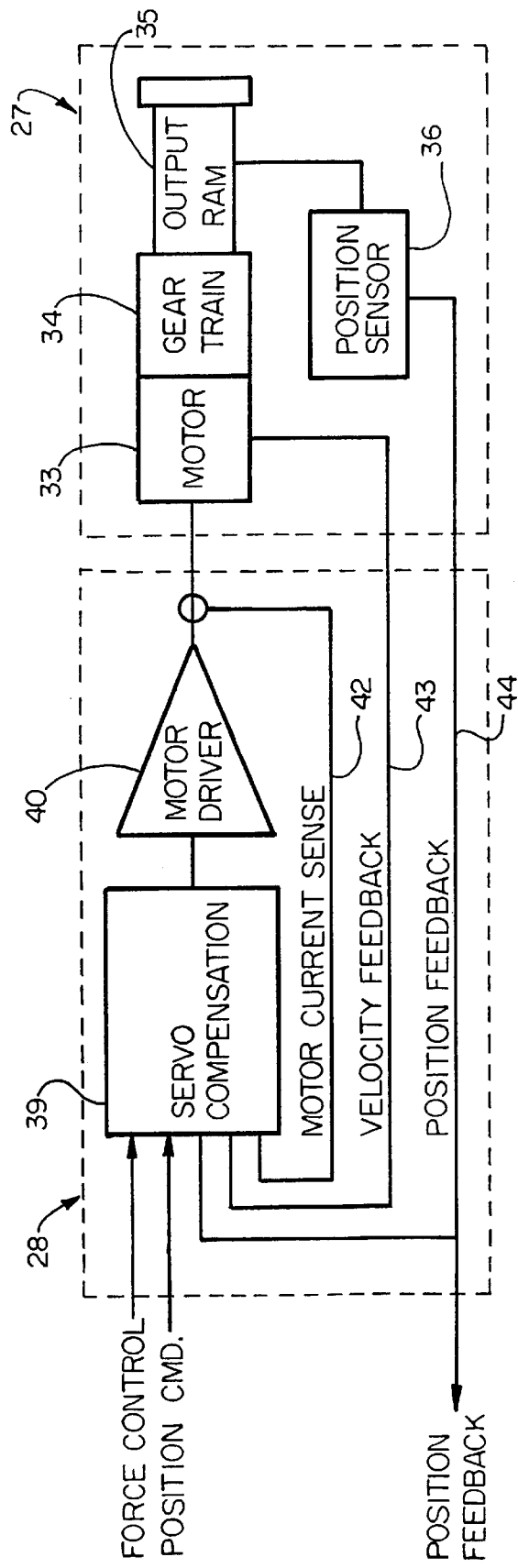
FIG. 2 is a diagrammatic illustration of a brake actuator and associated servo amplifier employed in the system of FIG. 1.

In FIG. 2, a representative electro-mechanical brake actuator 27 and associated servo amplifier 28 are illustrated in greater detail. The brake actuator 27 includes an electric servo motor 33, gear train 34, and a reciprocating output ram 35. The brake actuator has associated therewith an output ram position sensor 36 which provides for actuator position feedback as depicted. Although not shown, the brake actuator 27 also has associated therewith a motor tachometer to provide for velocity feedback.

The servo amplifier 28 includes servo loop compensation networks and amplifiers 39, and a DC motor driver 40 with associated control logic and current control circuitry. More particularly, the position servo amplifier 28 may include an inner motor current control servo loop 42, an intermediate motor velocity servo loop 43, and a ram position servo loop 44. Each loop may be compensated to obtain desired performance in terms of bandwidth, and to provide for uniform dynamic response of all brake actuators 27. In addition, the servo amplifier 28 includes means for controlling motor current and therefore the output force of the brake actuator in response to a force control input. The force control input may be an analog input signal that controls motor current level while the aforesaid position command input controls actuator displacement. As will be appreciated, the analog input signals may be replaced by digital input signals if a digital signal processor is used in the servo amplifier for actuator control.

As indicated, the displacement of each actuator 27 is controlled by the electronic controller 21 (FIG. 1). The micro-processor 29 of the controller provides brake control algorithm processing, temporary data storage, in RAM, program memory storage, non-volatile data storage, and control of the servo amplifiers 28 via the input/output circuitry 30. The input/output circuitry 30 provides for digital-to-analog data conversion, generating the analog position commands and the analog motor current control commands to the four actuators, analog-to-digital data conversion to monitor the actuator position sense and motor current feedback signals, and signal discretes for auxiliary functions such as motor brake control. The micro-processor may also be interfaced via a serial communication link with other control components as needed, such as, for example, a anti-skid brake control unit. Although a micro-processor is utilized in the illustrated preferred embodiment, processing alternatively could be done analog as opposed to digital, or intermixed with digital processing as may be desired.

In the illustrated system, the four servo amplifiers 28 (FIG. 2) are independent and functionally identical, each amplifier being controlled by the micro-processor 29, responding to the position commands and motor current control signals from the processor, and feeding back the actuator position and motor current sense signals to the processor via the I/O circuitry 30.

The controller may use two separate power sources: for example, a 28 VDC supply to power the low level electronic circuitry and 28 to 270 VDC supply to power the four actuator motors through the motor driver power stage. The 28 VDC actuator power may be utilized in emergency situations when 270 VDC is not available to power system fault.

Figure 3:
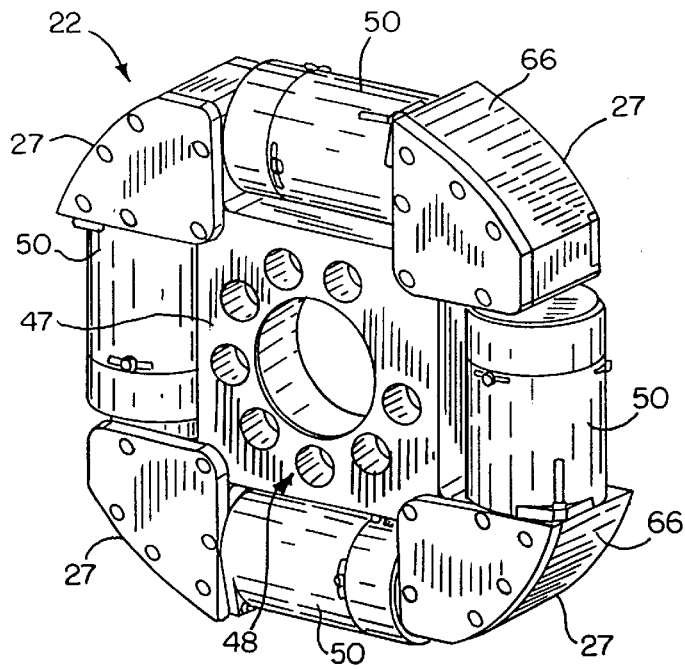
FIG. 3 is a perspective view of an exemplary brake housing and actuator assembly useful in the system of FIG. 1.
Figure 4:
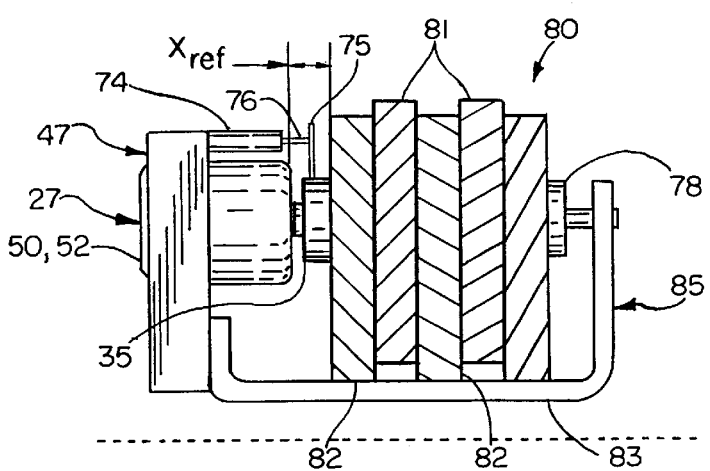
FIG. 4 is a schematic view showing a brake actuator assembly in relation to a new brake disk stack.
Figure 5:
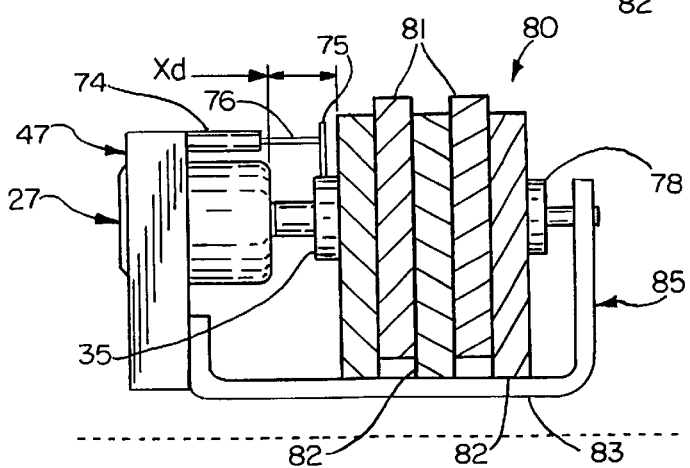
FIG. 5 is a schematic view showing the brake actuator in relation to a worn brake disk stack.

Further details of an exemplary brake actuator assembly 22 are shown in FIGS. 3–5. The brake actuator assembly includes a housing 47 that provides for the mounting of an electro-mechanical actuator 27, it being understood that typically multiple actuators will be mounted to the housing, such as four functionally identical actuators located at respective quadrants of the housing. The illustrated housing has a bolt circle 48 for mounting to the overall wheel and brake assembly 23 (FIG. 1). Each actuator 27 may include a DC brushless servo motor 50 and suitable reduction gearing 52 that translates rotary motor motion to linear motion of the ram 35 (the rams are hidden from view in FIG. 3). The brushless DC servo motor 50 may have integrated or otherwise associated therewith a friction type, fail-safe (power-off engaged) brake (not separately shown), and a resolver (not separately shown) for motor rotor commutation and angular velocity sensing. The resolver provides motor position feedback and velocity information. In particular, the resolver provides an electrical signal that is proportional to motor shaft position.

The ram 35 of each actuator is mechanically connected to an LVDT position sensor 74, such as by bracket 75. The LVDT armature 76 may be adjustably attached to the bracket (or the sensor body to the brake housing) by suitable means that provides for LVDT setting and position calibration. A cover (not shown), or the like, may be provided to protect for the LVDT mounting mechanism. Although an LVDT sensor is preferred, other types of position sensors/transducers may be used as desired for a particular application.

The purpose of the brake actuator(s) 27 is to impress a clamping force on the stack 80 of brake disk elements. The electro-mechanical (EM) actuator(s) operate simultaneously to produce a clamping force between a brake reaction plate 78 and the actuator output rams 35. An exemplary system utilizes four actuators, operating simultaneously, to provide the total brake clamping force required. However, the size and number of actuators may be varied to provide the total brake clamping force required. The actuators may be operated in a controlled displacement mode such that the clamping force is proportional to the deflection of the reaction plate. Although each actuator can operate independently, the actuators may be commanded in pairs (or otherwise), the actuators of each pair being located physically on diametrically opposite sides on the brake housing.

The brake disk stack 80 includes alternating rotor disks 81 and stator disks 82 mounted with respect to a torque tube 83 or similar member and the wheel (not shown) for relative axial movement. Each rotor disk 81 is coupled to the wheel for rotation therewith and each stator disk 82 is coupled to the torque tube 83 against rotation. A back plate 85 is located at the rear end of the brake disk stack and functions as a force reaction member via the reaction plate 78. The brake actuator 27 is mounted to brake housing 47 fixed with respect to the torque tube. The ram 35 of the actuator extends to compress the brake disk stack 80 against the back plate 85, and torque is taken out by the stator disks 82 through the static torque tube 83 (or the like).

Figure 6:
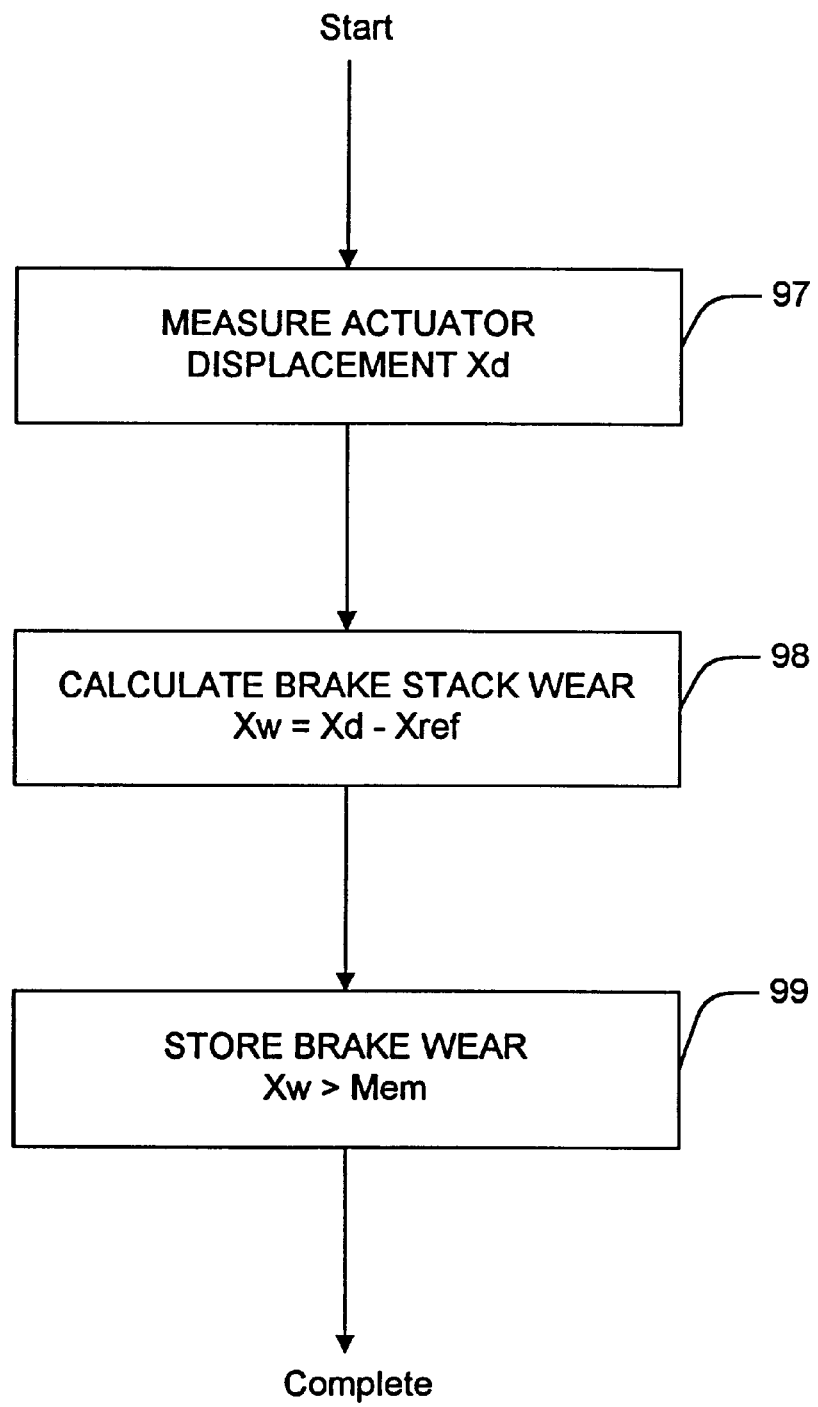
FIG. 6 is a flowchart illustrating a method for measuring brake disk stack wear.

As the brake disks wear, the collective axial thickness thereof will decrease. In accordance with the invention, the controller 21 (FIG. 1) is suitably programmed to carry out a wear measurement routine which is illustrated by the flow chart shown in FIG. 6 and a running clearance adjustment routine which is illustrated by the flow chart shown in FIG. 9. The wear measurement routine preferably uses a reference value corresponding to zero wear, such value corresponding to the thickness of a new brake disk stack. The new brake stack reference value is determined by the controller in accordance with a routine illustrated by the flow chart shown in FIG. 7. Both the wear measurement routine and the new brake disk stack reference measurement routine preferably use a further routine for measuring actuator displacement, this routine being illustrated by the flow chart shown in FIG. 8.

Figure 8:
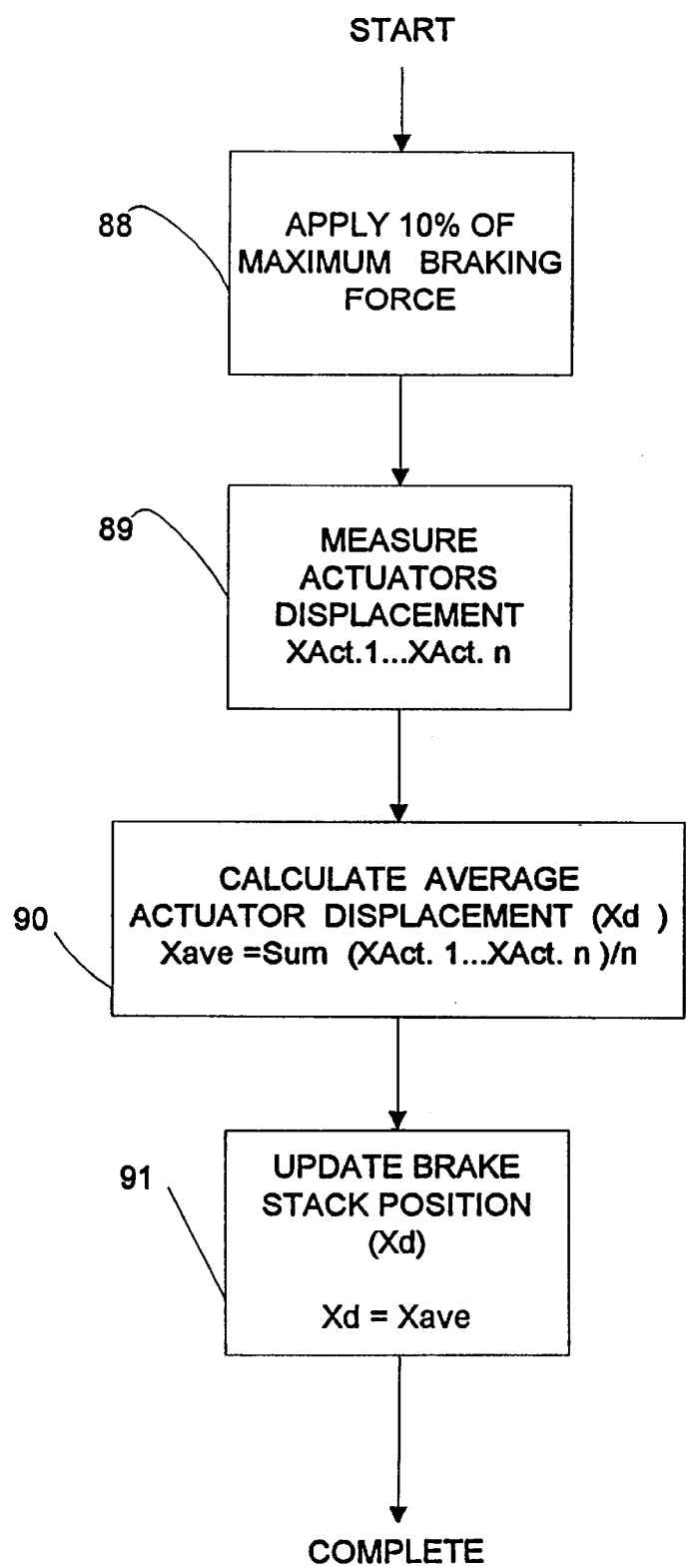
FIG. 8 is a flowchart illustrating a method for measuring brake actuator displacement.

In FIG. 8, actuator displacement measurement begins at step 88 where the actuator rams (or ram in a single actuator system) are extended by the controller to load the brake disk stack by a predetermined amount. The amount of loading need only be enough to ensure that the individual disks of the brake disk stack are held against one another to remove any slack in the stack. For this purpose, the actuator rams preferably apply about 10% of maximum braking force to the brake disk stack. At step 89, the displacement (travel) X of each actuator ram is measured using the respective position sensor 74 (FIGS. 4 and 5). Then, preferably, an average actuator ram displacement is calculated at step 90, and at step 91 the average actuator ram displacement Xave is used to establish the actuator displacement value Xd. More particularly, in the illustrated preferred embodiment where the controller operates the actuators in pairs (each pair including diametrically opposite actuators), the actuator ram displacement of the actuators of each pair is measured and used to calculate an average actuator displacement value for that pair of actuators. Thus average actuator displacements are calculated for each set of paired actuators. This is done because positions of the rams may vary for the same input, as when one actuator pushes harder than the other actuator with which it is paired.

Figure 7:
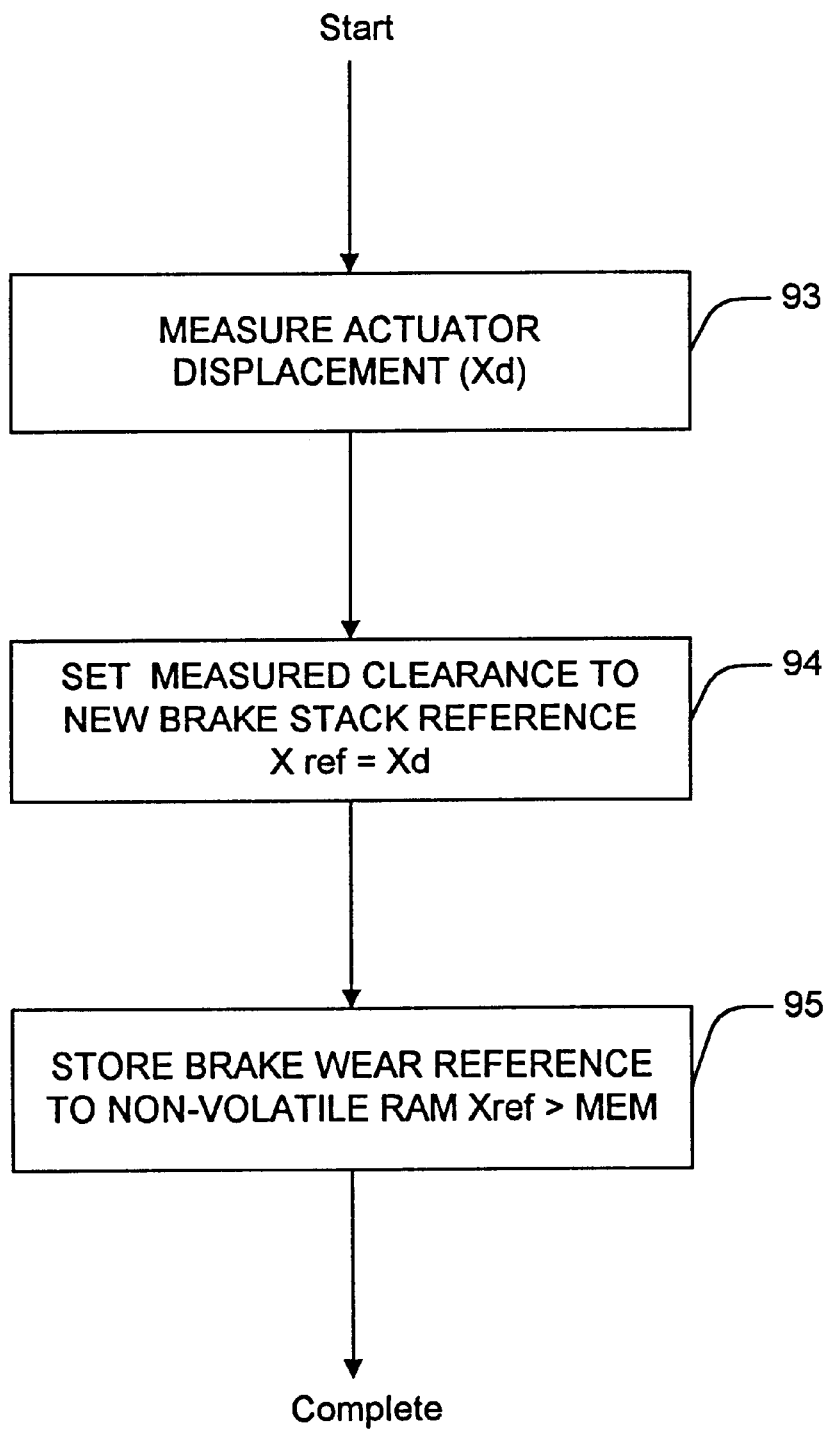
FIG. 7 is a flowchart illustrating a method for obtaining a new brake disk stack reference value.

In FIG. 7, the new brake disk stack reference measurement routine begins at step 93 where the actuator displacement measurement routine of FIG. 8 is used to return an actuator ram displacement measurement Xd for a new brake disk stack. At step 94, the new brake disk stack reference measurement value Xref (see FIG. 4) is then set by the controller to the measured clearance Xd. At step 95, the new brake disk stack reference value is then stored, preferably in non-volatile memory, for use by the brake wear measurement routine.

Returning now to FIG. 6, brake wear measurement begins at step 97 where the actuator displacement measurement routine of FIG. 8 is used to return an actuator ram displacement measurement Xd for the brake disk stack which has undergone wear as depicted in FIG. 5. Then, at step 98, brake disk stack wear Xw is calculated by subtracting the brake disk stack reference measurement value Xref from the measured ram displacement Xd. The brake disk stack wear Xw then may be stored at step 99 in memory. The brake disk stack wear Xw may also be used by the controller to provide a warning signal if the brake disk stack wear satisfies a predetermined criteria. For example, if the brake disk stack has worn to a predetermined percentage of its original thickness, then a signal may be given to indicate that the brake disk stack requires replacement.

Figure 9:
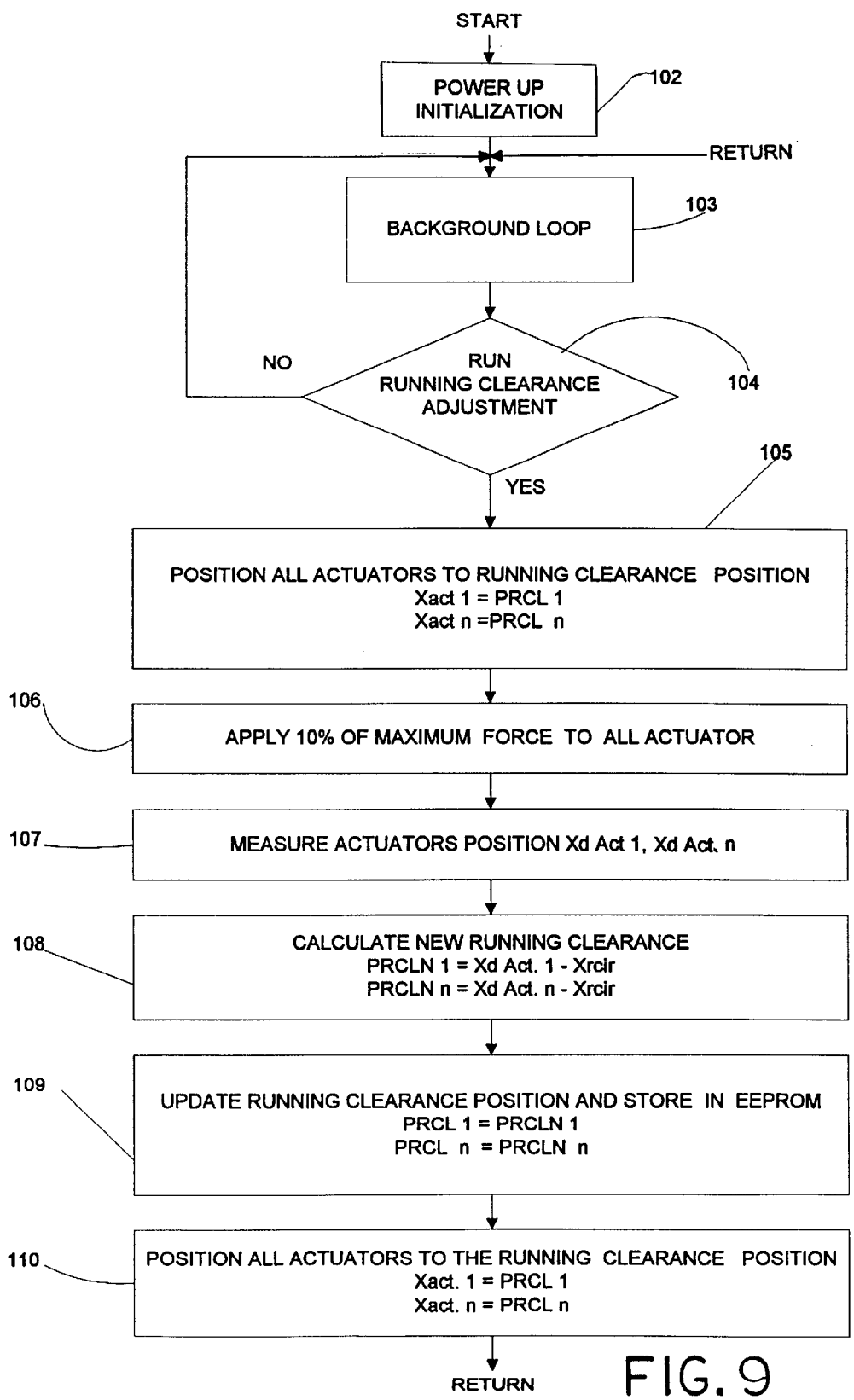
FIG. 9 is a flowchart illustrating a method for effecting running clearance adjustment.
Figure 10:
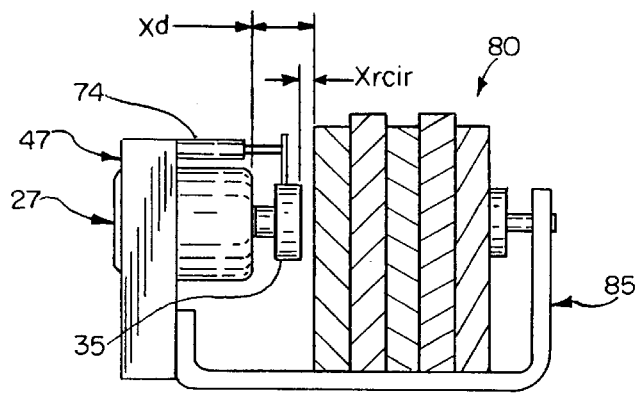
FIG. 10 is a schematic view showing the running clearance in relation to actuator ram displacement.

Referring now to FIG. 9, the running clearance adjustment routine begins upon the system being powered up initially at step 102. After initialization, operation proceeds to a background loop at step 103. The background loop includes as one of its procedures (other procedures may include, for example, health monitoring procedures and command confirmation procedures) a step 104 where the controller checks to see if a running clearance adjustment should be made. In the illustrated system, this is determined by the brake control system which may send an enable command at an appropriate time for running clearance adjustment, as when the landing gear is extended before landing, or when the plane is on the ground. If the prescribed criteria is not satisfied, the controller returns to the background loop 103. If the prescribed criteria is satisfied, the controller proceeds to step 105 at which all actuators are positioned at the then active running clearance position. Then, at step 106, the actuator rams (or ram in a single actuator system) are extended to load the brake disk stack by a predetermined amount. As before, the amount of loading need only be enough to ensure that the individual disks of the brake disk stack are held against one another, again to remove any slack from the stack. For this purpose, the actuator rams preferably apply 10% of maximum braking force to the brake disk stack. At step 107, the displacement Xd (travel) of each actuator ram (or average displacement of paired actuators) is measured using the respective position sensor 74 (FIGS. 4 and 5). Then, at step 108, a new running clearance PRCLN is calculated for each actuator (or actuator pair) by subtracting a fixed displacement Xrclr from the measured ram displacement Xd (or average displacement). At step 109, the new running clearance value PRCLN is set as the active running clearance PRCL which is stored, preferably in non-volatile memory. Finally, at step 110, the controller positions each actuator at the active running clearance position, after which the controller returns to the background loop.

It is noted that although the position sensor is used to provide information on the position of the ram, the resolver could be used to provide the running clearance adjustment. That is, the controller can use the output of the resolver to determine the running clearance position of the rams. However, preferably an absolute position encoder is used. The absolute position sensor (e.g. LVDT 74) is insensitive to a power loss, whereas use of a resolver, or other relative position based system, may lose track of the ram position (the resolver could change position with no corresponding output being registered by the controller).

Figure 11:
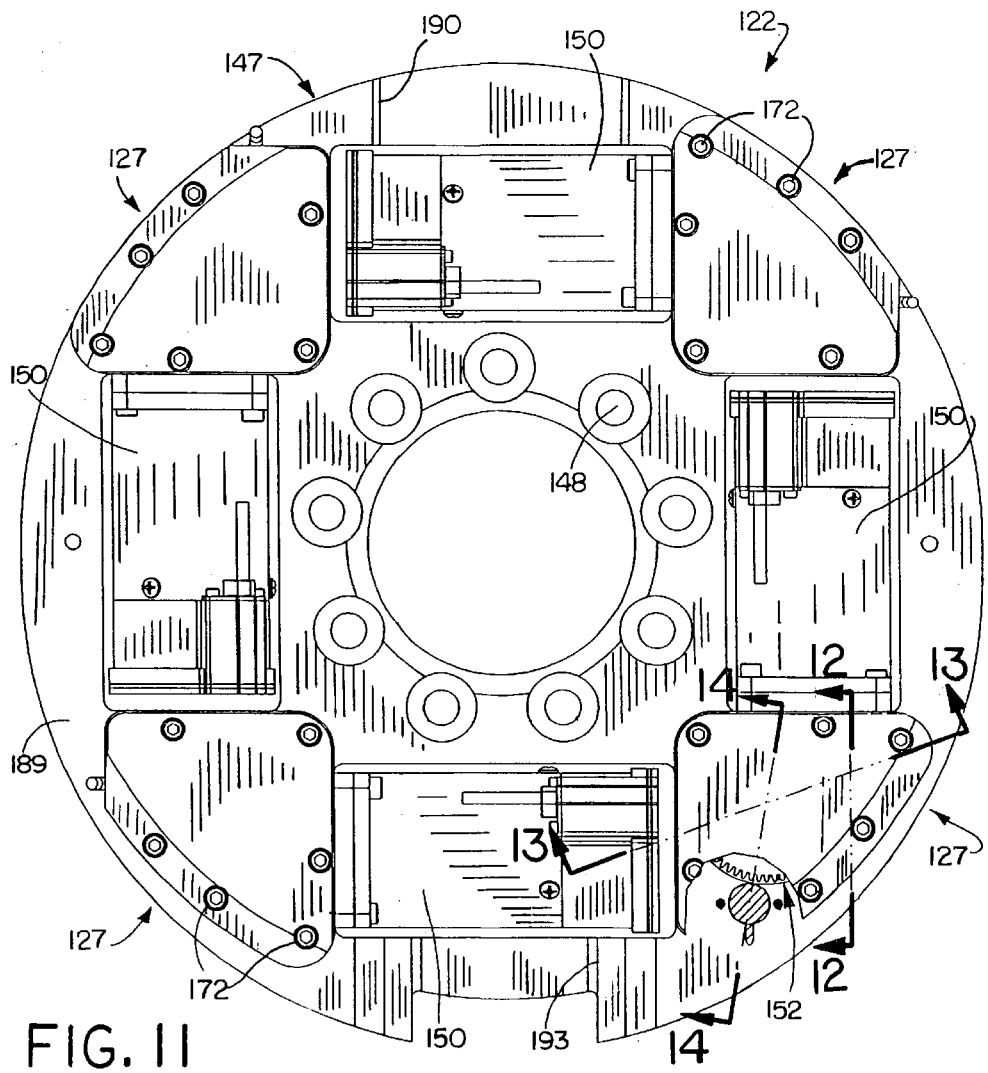
FIG. 11 is an end elevational view of another brake actuator assembly useful in the system of FIG. 1.
Figure 12:
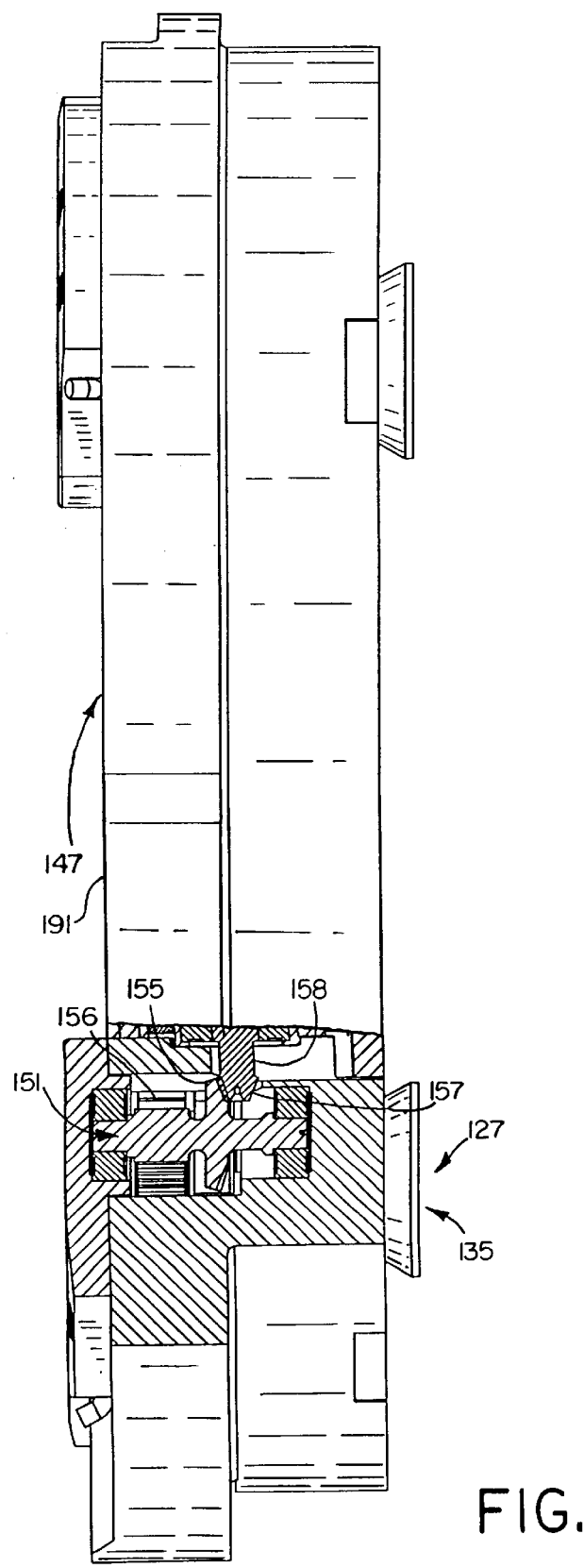
FIG. 12 is a part elevational, part sectional view of the brake actuator assembly of FIG. 11, taken along the line 12—12 of FIG. 11.
Figure 14:
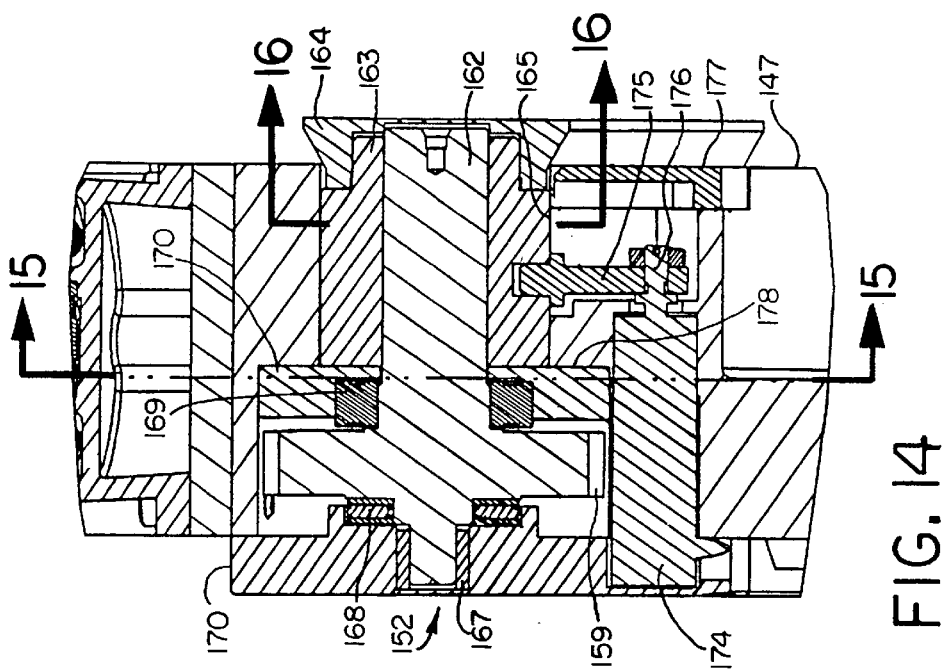
FIG. 14 is a partial sectional view of the brake actuator assembly of FIG. 11, taken along the line 14—14 of FIG. 11.
Figure 13:
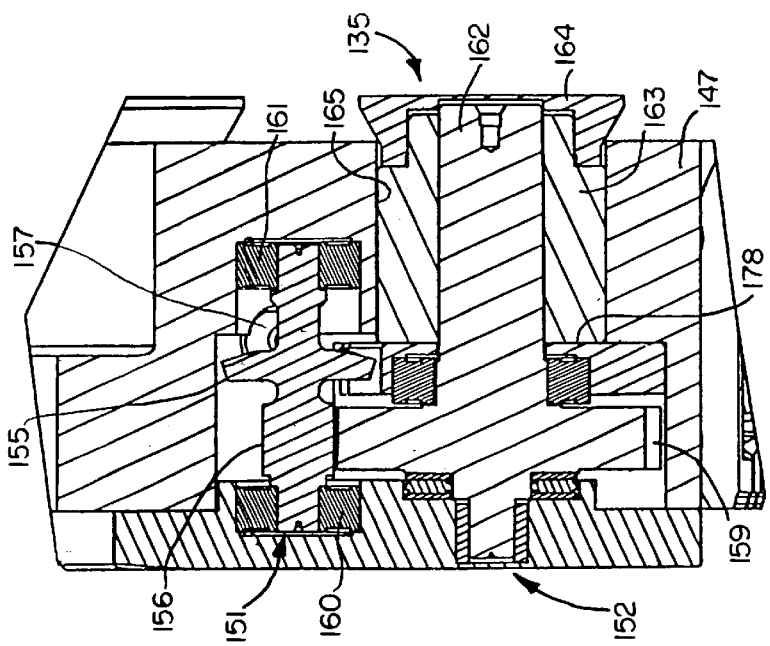
FIG. 13 is a partial sectional view of the brake actuator assembly of FIG. 11, taken along the line 13—13 of FIG. 11.
Figure 15:
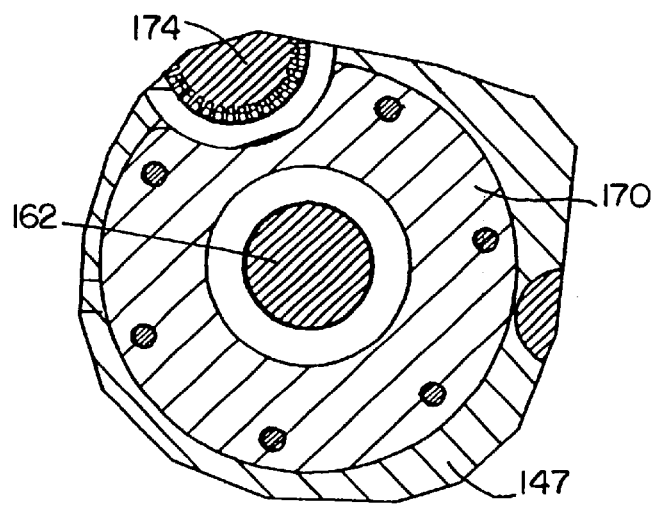
FIG. 15 is a partial sectional view of the brake actuator assembly of FIG. 11, taken along the line 15—15 of FIG. 14.

Referring now to FIGS. 11 and 12, another exemplary brake actuator assembly is generally indicated by reference numeral 122. The brake actuator assembly 122 includes a housing 147 that provides for the mounting of multiple electro-mechanical actuators, such as the illustrated four functionally identical actuators 127 located at respective quadrants of the housing. The illustrated housing has a bolt circle 148 for mounting in a wheel and brake assembly, such as in a known manner to a torque tube included in such an assembly. Each actuator 127 preferably includes a DC brushless servo motor 150, an intermediate cluster gear member 151, and a ball screw assembly 152. The brushless DC servo motor 150 may have integrated or otherwise associated therewith a friction type, electrically actuated brake (not separately shown), and a resolver (not separately shown) for motor rotor commutation and angular velocity sensing. The resolver provides motor position feedback and velocity information. In particular, the resolver can provide an electrical signal that is proportional to motor shaft position under normal operating conditions. The motor brake may be a power-on type or a power-off type, as desired for a particular application. The motor brake is useful for parking the aircraft. To this end, the actuator rams can all be extended to engage the brakes and then the motor brakes may be engaged to hold the actuator rams in their extended/engaged positions. Once the motor brakes are engaged, power to the motor components of the servo motor 150 (the ram drive motor components) can be shut off. The specific motor selection will be dependent on the requirements for a given braking application. In the illustrated embodiment, the servo motor components, friction brake and resolver are all integrated into a common motor housing and collectively may be referred to as a servo motor.

As shown in FIGS. 12–15, the intermediate cluster gear member 151 provides for two stages of reduction gearing and includes a first stage gear 155 and a second stage gear 156. The first stage gear, which provides the first stage of gear reduction, is a bevel gear that meshes with a bevel gear 157 integral with the drive shaft 158 of the motor. The second stage gear 156 is a straight spur gear that mates with a ball screw gear 159 formed integrally with a ball screw 162. The intermediate cluster gear member is supported by ball bearings 160 and 161 at its ends. Although reference herein is made to certain structures as being integral as is preferred, it should be understood such structures alternatively may be composed of discrete components joined together to form a functionally equivalent structure.

The ball screw assembly 152 is comprised of the ball screw 162 with the integral gear 159, a hexagonal ball nut 163 that translates rotary motion to linear motion of the ball nut, and a pad 164 that attaches to the end of the ball nut and provides the interface to the brake disk pressure plate. The ball screw and ball nut, which provide a third stage of reduction, may be of a known configuration and thus the respective spiral grooves thereof and associated balls have not been illustrated as the same would be immediately evident to one skilled in the art. The ball nut (also herein referred to as a ram or ram nut) is free to translate along the axis of the ball screw upon rotation of the ball screw, but not to rotate, as the ball nut is guided by a hexagonal bore 165 in the housing 147.

Figure 16:
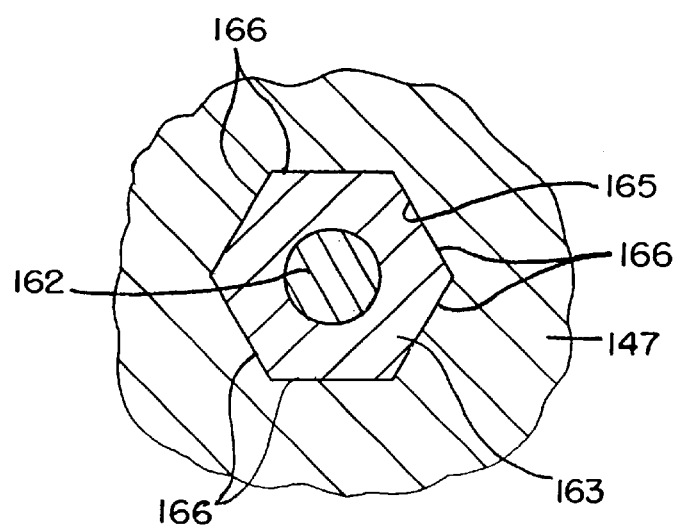
FIG. 16 is a partial sectional view of the brake actuator assembly of FIG. 11, taken along the line 16—16 of FIG. 13.

As best seen in FIG. 16, the hexagonal bore or guideway 165 and the ball nut 163 respectively have, in the illustrated preferred embodiment, corresponding polygonal cross-sections defined by plural inner/outer side surfaces (commonly indicated by reference numeral 166) which rotationally interfere with one another to restrain rotation of the ram nut 163 relative to the housing 147. As is preferred and illustrated, one or more of the side surfaces, most preferably all of the side surfaces, are planar and form regular polyhedrons providing a close sliding fit between the ball nut and guideway. It will be appreciated, however, that other configurations may be used although less preferred.

For example, the number of sides may be varied from the illustrated six-sided polygons (hexagons), as may be desired for a particular application. The six-sided polyhedral configuration provides desired sliding and anti-rotational characteristics.

Preferably, a lubricant, particularly a suitable grease, is used to lubricate that relatively sliding surfaces 166 of the ball nut 163 and guideway 165. It has been found that the grease and close clearance between the ball nut and guideway prevent entry of any appreciable amount of dirt or other foreign material at the sliding surfaces interface so as to prevent any significant degradation of performance. However, if desired, a suitable seal, such as a wiper seal or a rolling diaphragm seal, could be employed to seal against passage of dirt or other undesirable materials between the sliding surfaces. An exemplary grease for the ball screw and ram nut assembly is MIL-G-81322 and an exemplary grease for the gear train is MIL-G-81827.

The driving torque is applied to the mechanism through the integral gear 159 that drives the ball screw 162 causing the ball nut 163 to translate thus converting input torque to linear output force. The translating ball nut contacts the front of the stack of brake disks through the interface pad 164 and functions as an actuator ram 135. The ball screw is supported by three bearings, a radial bearing 167 and a thrust roller bearing 168 at the outboard end of the ball screw and a radial ball bearing 169 at a location intermediate the nut-engaging threaded portion of the ball screw and the integral gear 158. A bearing plate 170 is used to support the ball bearing 169 in the housing. An actuator cover 171 locates the radial and thrust bearings and provides mechanical thrust support for the ball screw. The cover is attached to the actuator housing by suitable means such as screws 172 (FIG. 11).

Each ball nut 163 (actuator ram 135) is mechanically connected to an LVDT position sensor 174, such as by bracket 175. The LVDT armature 176 may be adjustably attached to the bracket (or the sensor body to the brake housing) by suitable means that provides for LVDT setting and position calibration. A cover 177 may be provided to protect the LVDT mounting mechanism. Although an LVDT sensor is preferred, other types of position sensors/transducers may be used as desired for a particular application.

Like the brake actuators 27 (FIGS. 4 and 5), the purpose of the brake actuator(s) 127 is to impress a clamping force on a stack of brake disk elements. The electro-mechanical (EM) actuator(s) operate simultaneously to produce a clamping force between a brake reaction plate and the actuator output rams 135. Again, the size and number of actuators may be varied to provide the total brake clamping force required. The position of the rams, as opposed to motor current, preferably is used to obtain desired braking load. It is noted however that the above described running calibration technique is carried out in a current mode, although with use of the position transducer.

The use of position sensing and position servo for controlling brake force application provides advantages over other control methodologies. One advantage is the elimination or reduction of hysteresis associated with other means of control, such as force control where the clamping force application is controlled via motor current application. Another advantage is that position mode control provides for optimum brake clamping force dynamic response. By sensing the position at the actuator ram and using absolute position sensing, as compared to relative position sensing (see, for example, U.S. Pat. No. 4,995,483), enhances performance aspects of the system. The system will recover immediately from disturbances such as power outages during braking without the possibility of uncommanded brake application. As above mentioned, the relative position sensing technique used in the prior art (see, for example, U.S. Pat. No. 4,995,483) requires a re-calibration of the position sensor after a power interruption which may result in loss of braking capability, long recovery time and possible uncommanded brake clamp force application.

As will be evident to the skilled person, brake clamp application relies on the spring constant of the brake torque tube since brake clamp force is a function of the actuator ram displacement and the torque tube spring constant. When applying a clamping force, the brake controller calculates the required position for given clamping force using the torque tube spring constant as the proportional constant. The value for the torque tube constant can be the theoretical value or can be directly measured by the system using a calibration routine running as an extension of the running clearance calibration routine. That is, the spring constant calibration routine can measure the ram displacement, $\Delta X$, for each ram, for a full force command, $\Delta$Force, and calculate the spring constant, given by $\Delta X/\Delta$Force.

Another advantage provided by the present invention is the capability of equalizing, by way of the aforesaid calibration, the brake clamping force between the four (plural) rams without the need for sensing the force on each actuator ram.

Although each actuator 127 can operate independently, the actuators may be commanded in pairs (or otherwise) using two controllers, the actuators of each pair being located physically on diametrically opposite sides on the brake housing. If one controller were to fail, the remaining controller would still be functioning. The controllers may also be programmed to compensate for failure of one or more of the position sensors 174, as by then using current and torque feedback to control the position of the corresponding actuator ram or rams. That is, the controller may be programmed to operate in a position mode (the preferred normal mode of operation) and a current mode (back-up mode in event of position sensor failure).

In a power failure mode, it will be appreciated that any resultant retraction of an engaged actuator ram 135 may be quite rapid (as arises from the high efficiency and reversibility of the ball screw and ball nut, and the other gearing, and from the high spring force that may be stored in the torque tube under braking conditions). The rapid retraction of the ram may cause significant shock to the system as the ram bottoms out at the end of its permitted degree of travel, which in the illustrated embodiment is determined by engagement against the annular shoulder surface of the housing 178 at the outboard end of the ram guideway. Preferably, the ram's return motion is stopped slowly to provide a "soft stop." This may be accomplished mechanically by the interpositioning of springs between the back (outboard) end of the ram and the shoulder surface. This however adds weight and size to the actuator assembly. A more preferred approach according to the present invention is to provide an electronic soft stop for each ram. This is accomplished by coupling the motor to a damping circuit (preferably provided in the controller) in a power failure mode so that the retarded motion of the motor slows the ram down to provide a soft landing. The damping circuit dissipates the energy stored in the motor inertia, plus the load spring induced loads, such that the actual ram speed is reduced to a safe level as the actuator ram reaches the back feed retract stop (i.e., whatever structure is used to limit the maximum retraction of the ram). The soft stop circuit includes a resistive element for energy dissipation, solid state switches and power monitoring and control logic circuitry to couple the motor to the resistive element under the appropriate operating conditions. More particularly, when the power monitoring logic detects a power failure, the motor is coupled by the solid switching (or other suitable means) to the resistive components for reducing the motor speed to a safe level.

During normal operation, the position of the ram is known by reason of the position transducer, and thus the controller can function to prevent any hard landing of the ram.

Figure 18:
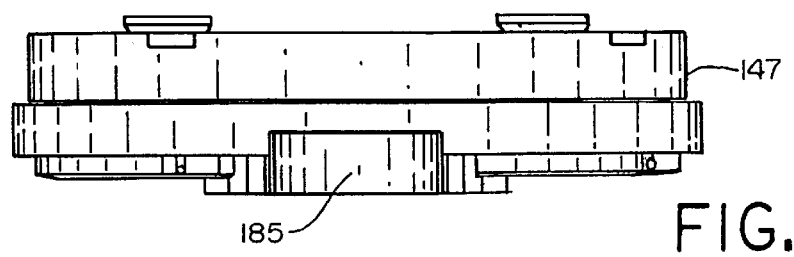
FIG. 18 is a edge view of the brake actuator assembly and torque take-out bracket, looking from the line 18—18 of FIG. 17.
Figure 17:
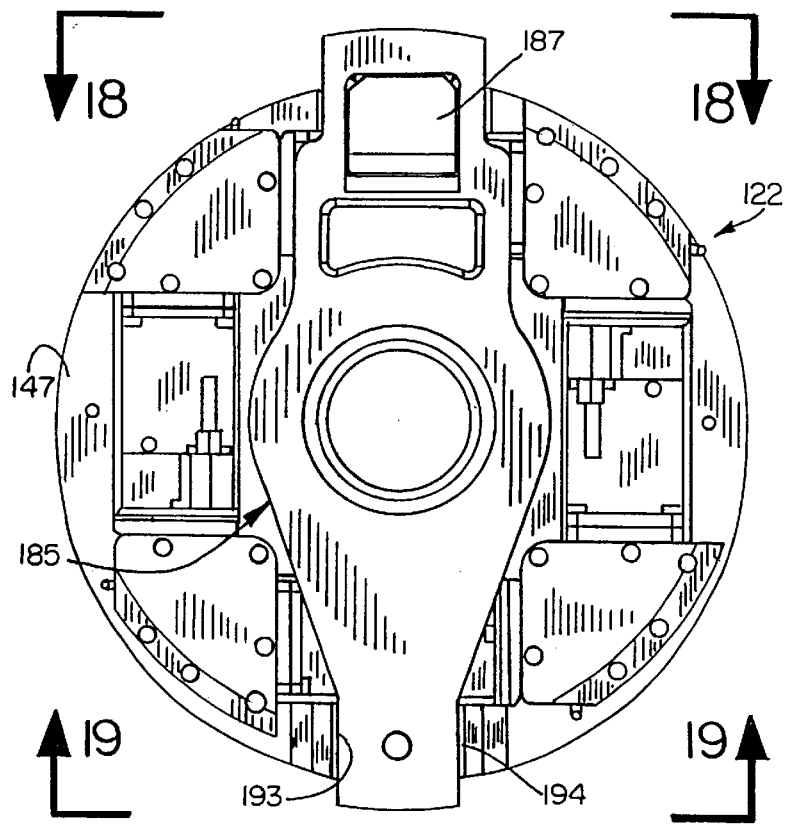
FIG. 17 is an elevational view of the brake actuator assembly of FIG. 11, with a torque take-out bracket assembled thereon.
Figure 19:
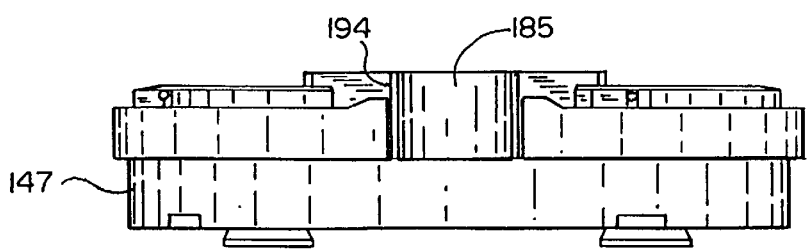
FIG. 19 is a edge view of the brake actuator assembly and torque take-out bracket, looking from the line 19—19 of FIG. 17.

Referring now to FIGS. 17–19, a torque take-out bracket 185 is shown assembled on the brake actuator assembly 122. The torque take-out bracket 185 extends diametrically across the housing 147 and functions as an interface between the brake actuator assembly and a landing gear axle structure (not shown). The landing gear structure, as is well known in the art, may include a wheel axle, steering linkage and, in particular, a torque reaction arm. The torque reaction arm and torque take-out bracket 185 have interengaging devices which provide for transfer of torque from the torque take-out bracket to the torque reaction arm when braking force is being applied to the disk brake stack by the brake actuator assembly. In the illustrated embodiment, the take-out bracket 185 has on the outboard side thereof an axially opening recess (socket) 187 for receiving a torque reaction lug on the torque reaction arm. The recess 187 is located adjacent the radially outer peripheral portion 189 of the housing which has a recess 190 (FIG. 11) in an outboard side face 191 (FIG. 12) thereof in which the adjacent end of the take-out bracket is captured. In this manner the torque reaction arm and torque take-out bracket are rotationally interlocked.

The recess 190 is formed in the radially outer peripheral portion 189 of the housing 147 which is circumferentially continuous and circumscribes housing compartments containing the motors 150 and the guideways 165 containing the actuator ram nuts 163 as best seen in FIGS. 1 and 17. At the side of the housing diametrically opposite the recess, there is provided another recess 193 for a load cell 194. As is preferred, the housing is formed slightly oblong at its end adjacent the load cell recess 193 so that additional housing structure protrudes radially outwardly of the circular peripheral portion thereof to provide a radially enlarged receptacle for the load cell. It is noted that this arrangement is enabled by the use of the above described intermediate cluster gear member 151. In addition to providing two stages of gear reduction, the intermediate cluster gear member 151 allows the motors to be positioned radially inwardly of the outer peripheral ring portion of the housing and thus provides radial clearance with the load sensor and the torque lug.

The load cell 194 is mounted to the torque take-out bracket at the end thereof diametrically opposite the end thereof including the torque reaction recess 187. Accordingly, the load cell functions as a secondary lug for torque take-out and thus the output of the load cell will be indicative of brake torque.

As though skilled in the art will appreciate, other types of screw drives may be used in place of the preferred ball screw drive. Accordingly, the reference herein to lead screw is intended to be a generic reference to screw drive devices and the like.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiment or embodiments of the invention. In addition, while a particular feature of the invention may have been described above with respect to only one of several illustrated embodiments, such feature may be combined with one or more other features of the other embodiments, as may be desired and advantageous for any given or particular application.

In addition, the invention is considered to reside in all workable combinations of features herein disclosed, whether initially claimed in combination or not and whether or not disclosed in the same embodiment.

What is claimed is:

1. A brake system comprising:

a brake disk stack;

a reciprocating ram;

a motive device operatively connected to the reciprocating ram for selectively moving the reciprocating ram into and out of forceful engagement with the brake disk stack for applying and releasing braking force on a rotatable wheel;

a controller for controlling the motive device for selective control of the reciprocating ram and regulation of the force applied by the reciprocating ram against the brake disk stack, and a position sensor which supplies a position signal representative of the position of the reciprocating ram; and wherein the controller includes means for effecting displacement of the reciprocating ram to load the brake disk stack by a predetermined amount based on a present displacement value of the position signal obtained from the position sensor.

2. A brake system as set forth in claim 1, wherein the position sensor includes a LVDT transducer.

3. A brake system as set forth in claim 2, comprising a brake housing to which said motive device is mounted, and said LVDT transducer is connected between said reciprocating ram and brake housing.

4. A brake system as set forth in claim 1, wherein the motive device is a servo motor.

5. A brake system as set forth in claim 1, in combination with an aircraft wheel assembly.

6. A method for controlling operation of a brake system, the brake system including a motive device operatively connected to a reciprocating ram for selectively moving the reciprocating ram into and out of forceful engagement with the brake disk stack for applying and releasing braking force on a rotatable member, and a controller for controlling the motive device for selective control of the reciprocating ram and regulation of the force applied by the reciprocating ram against the brake disk stack, said method comprising the steps of:

using a position sensor to supply a position signal representative of the position of the reciprocating ram;

effecting displacement of the reciprocating ram to load the brake disk stack by a predetermined amount based on a present displacement value of the position signal obtained from the position sensor.

7. A method as set forth in claim 6, wherein the step of using a position sensor includes using a LVDT transducer.

8. A method as set forth in claim 6, wherein a torque motor is used as the motive device for selectively moving the reciprocating ram into and out of forceful engagement with the brake disk stack.

* * * * *